United States Patent
Wang et al.

(10) Patent No.: US 12,405,569 B2
(45) Date of Patent: Sep. 2, 2025

(54) COLOR FILTER USING HOLOGRAPHIC ELEMENT

(71) Applicants: NITTO DENKO CORPORATION, Osaka (JP); Peng Wang, San Diego, CA (US); Sergey Simavoryan, San Diego, CA (US); Isamu Kitahara, San Diego, CA (US); Sheng Li, San Diego, CA (US)

(72) Inventors: Peng Wang, San Diego, CA (US); Sergey Simavoryan, San Diego, CA (US); Isamu Kitahara, San Diego, CA (US); Sheng Li, San Diego, CA (US)

(73) Assignee: Nitto Denko Corporation, Osaka (JP)

( * ) Notice: Subject to any disclaimer, the term of this patent is extended or adjusted under 35 U.S.C. 154(b) by 825 days.

(21) Appl. No.: 15/323,059

(22) PCT Filed: Jun. 25, 2015

(86) PCT No.: PCT/US2015/037804
§ 371 (c)(1),
(2) Date: Dec. 29, 2016

(87) PCT Pub. No.: WO2015/200705
PCT Pub. Date: Dec. 30, 2015

(65) Prior Publication Data
US 2017/0160700 A1    Jun. 8, 2017

Related U.S. Application Data

(60) Provisional application No. 62/017,102, filed on Jun. 25, 2014.

(51) Int. Cl.
*G03H 1/00* (2006.01)
*G02B 5/20* (2006.01)
(Continued)

(52) U.S. Cl.
CPC ........... *G03H 1/0005* (2013.01); *G02B 5/203* (2013.01); *G02C 7/104* (2013.01); *G03H 1/0402* (2013.01);
(Continued)

(58) Field of Classification Search
CPC .. G03H 1/0005; G03H 1/0408; G03H 1/0402; G03H 2001/0441; G03H 2227/02;
(Continued)

(56) References Cited

U.S. PATENT DOCUMENTS

| 4,506,949 A | * | 3/1985 | Knop | G02B 5/203 |
| | | | | 348/291 |
| 2002/0030639 A1 | * | 3/2002 | Shimizu | G02B 27/144 |
| | | | | 345/32 |

(Continued)

FOREIGN PATENT DOCUMENTS

| EP | 0407773 | 1/1991 |
| EP | 2602656 | 6/2013 |
| TW | 200817733 | 4/2008 |

OTHER PUBLICATIONS

Benton et al. (NPL—Holographic Imaging, Wiley-Interscience, 2008) (Year: 2008).*

(Continued)

*Primary Examiner* — Marin Pichler
(74) *Attorney, Agent, or Firm* — K&L Gates LLP; Louis C. Cullman; Hal Gibson

(57) ABSTRACT

Described herein are devices, compositions, and methods for improving color discernment. In particular, devices and methods for correcting color blindness comprising a hologram that enhances the ability to distinguish a desired first bandwidth by decreasing the transmission of a second bandwidth. Advantageously, the device appears not tinted to outside observer.

13 Claims, 5 Drawing Sheets

(51) Int. Cl.
*G02C 7/10* (2006.01)
*G03H 1/04* (2006.01)
*G03H 1/18* (2006.01)
*G03H 1/26* (2006.01)

(52) U.S. Cl.
CPC ... *G03H 1/0408* (2013.01); *G03H 2001/0439* (2013.01); *G03H 2001/0441* (2013.01); *G03H 2001/186* (2013.01); *G03H 1/26* (2013.01); *G03H 2227/02* (2013.01); *G03H 2270/55* (2013.01)

(58) Field of Classification Search
CPC ..... G03H 2001/0439; G03H 2001/186; G03H 1/26; G03H 2270/55; G02B 5/203; G02C 7/104; Y10S 273/27; Y10S 116/41; A63F 2009/0006
USPC ..................................... 351/41–48; 359/1–35
See application file for complete search history.

(56) References Cited

U.S. PATENT DOCUMENTS

| | | | |
|---|---|---|---|
| 2008/0087848 | A1 | 4/2008 | Lin et al. |
| 2010/0188638 | A1* | 7/2010 | Eberl ..................... A61B 3/113 351/205 |
| 2013/0141527 | A1* | 6/2013 | Shimizu ............. G02B 27/0103 348/40 |
| 2013/0222919 | A1* | 8/2013 | Komatsu ............ G02B 27/0172 359/630 |
| 2015/0002809 | A1* | 1/2015 | Cohen-Tannoudji ....................... G02C 7/104 351/159.49 |

OTHER PUBLICATIONS

English Translation of Office Action, dated Aug. 15, 2019, for Taiwanese Patent Application No. 104120404 in 10 pages.

\* cited by examiner

COLOR FILTER USING HOLOGRAPHIC ELEMENT

CROSS REFERENCE TO RELATED APPLICATIONS

This application is a national phase of PCT/US2015/037804 filed on Jun. 25, 2015, which claims priority to U.S. 62/017,102 filed Jun. 25, 2014, the entire disclosure of which is incorporated by reference herein.

BACKGROUND

Field

Some embodiments are related to optical elements and methods for making such elements. Some embodiments are related to optical elements which include holographic materials which diffract a portion of light from the user's line of vision.

Description of the Related Art

It has been found that in lenses which selectively filter incident light in the visible region of the spectrum, the light received through the lens is modified so as to affect the manner in which it is handled neurologically by the viewer. Lenses have been produced for patients suffering from color blindness where the lenses are individually color tinted for the characteristics of a patient's vision (see U.S. Pat. No. 8,414,127). Such corrective lenses enable the patient to perceive colors correctly. Because the lenses are tinted, the purpose of the lenses is apparent to all outside observers, which is cosmetically undesirable for some patients.

SUMMARY

Devices described herein may be used to improve a person's ability to distinguish colors. These devices may be of benefit to both individuals having normal color vision and individuals having color vision deficiencies. The present embodiments relate to ophthalmic devices useful for enhancing color discrimination by persons having visual insensitivity between colors, e.g., correcting color blindness, that enhances discernment of one or more emissive bandwidths corresponding to a color that a person perceives as difficult to identify or distinguish. The bandwidth can be in the red, yellow, green, or blue region of visible wavelength light. In some embodiments, the ophthalmic device can enhance the ability to distinguish a desired first bandwidth by decreasing the transmission of a second bandwidth. For example, a person having color blindness may be able to perceive a first color, but confuse a second color with the first color. In some embodiments, the ophthalmic device can enhance the contrast or intensity between the two colors, increasing their distinction from one another. Advantageously, the ophthalmic device described herein may be clearly transparent (i.e., not tinted).

Some embodiments provide an ophthalmic device for improving color discernment, such as correcting visual insensitivity between a first visible color wavelength and a second visible color wavelength. In some embodiments, an ophthalmic device for interposition within the user's line of sight is provided, the device comprising a substantially transparent substrate and a holographic element, wherein the holographic element is in optical communication with the substrate and disposed within the line of sight, and wherein the holographic element comprises an interference pattern designed to diffract a selected portion of the visible spectrum of the incident light, such as the second visible color wavelength or the darkened wavelength range, out of the line of sight. In some embodiments, the holographic element comprises an interference pattern designed to diffract a selected portion of the incident light spectrum so that the portion of the spectrum, such as the second visible color wavelength or the darkened wavelength range, is subjected to total internal reflection. In some embodiments, a holographic element may diffract a portion of light from within the line of sight, to a critical angle into an optically coupled substantially transparent substrate wherein the portion the visible light spectrum, such as the second visible color wavelength or the darkened wavelength range is subjected to total internal reflection. In some embodiments, the interference pattern comprises a plurality of varied refractive index materials. In some embodiments, the interference pattern comprises a plurality of ridges disposed in the surface of the holographic element. In some embodiments, the holographic element is a hologram, wherein the hologram is made with a laser. In some embodiments, at least 40% of the undesired incident light spectrum is removed upon passing through the holographic element. In some embodiments, at least 10% of the desired incident light spectrum passes through the holographic element. In some embodiments, the desired removed wavelength is between about 450 nm and about 600 nm. In some embodiments, the holographic element comprises a photosensitive film. In some embodiments, the film can be a dichromated gelatin, a chemically-modified dichromated gelatin, a photopolymer, a nanoparticle-doped photopolymer, a silver halide film, or any combination thereof. In some embodiments, the holographic element is disposed on the substantially transparent substrate.

In some embodiments, a method for making an ophthalmic device is described comprising selecting a spectral range of undesired visual transmission for the ophthalmic device; and creating a holographic interference pattern within the ophthalmic device. In some embodiments, creating a holographic interference pattern within the ophthalmic device comprises impinging holographic media with an object beam. In some embodiments, the holographic media is a photosensitive media film. In some embodiments, the method further comprises developing the impinged photosensitive media film. In some embodiments, the method further comprises laminating the impinged photosensitive media to a substantially transparent substrate. In some embodiments, the ophthalmic device comprises a substantially transparent matrix lens material, and wherein the holographic interference pattern is formed within the matrix material.

Some embodiments include a method of correcting an impaired ability to distinguish colors comprising positioning an ophthalmic device described herein so that an image or an object may be viewed through the ophthalmic device by an individual having the impaired ability to distinguish colors.

Some embodiments include a method of improving the ability to distinguish colors comprising positioning an ophthalmic device, as described herein, so that an image or an object may be viewed through the ophthalmic device by an individual having normal color vision.

Generally, the methods and devices described herein may be used to improve the ability to distinguish colors by an individual having an impaired ability to distinguish colors and/or by an individual with normal color vision.

These and other embodiments are described in greater detail below.

DETAILED DESCRIPTION

Figure 1:
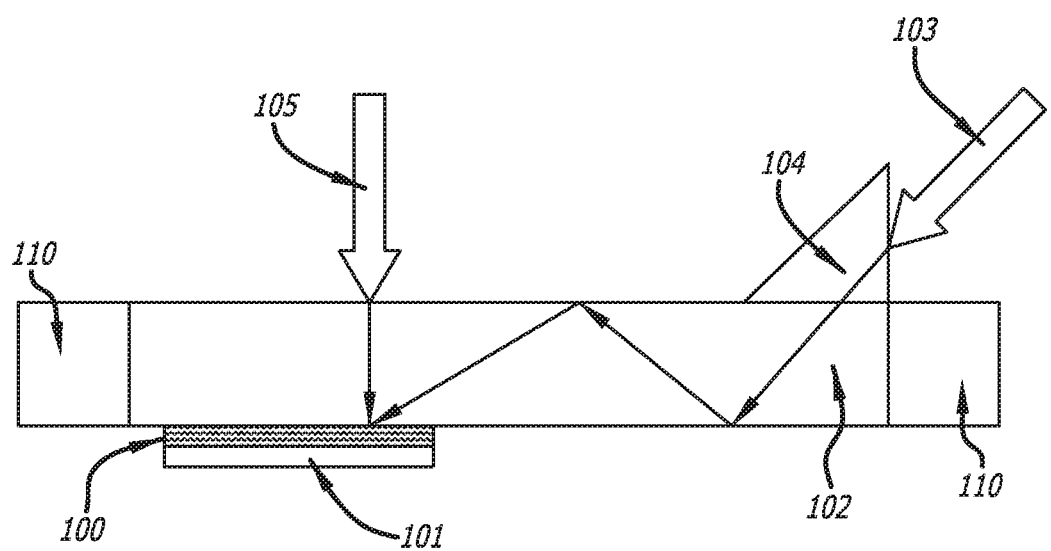
FIG. 1 is a schematic of an embodiment of a holographic element recording device.

Embodiments of the devices disclosed herein may be used to correct visual color deficiencies, such as visual insensitivity between a first visible color wavelength and a second visible color wavelength. In some embodiments, the device corrects visual insensitivity by decreasing the transmission or relative brightness of an emissive bandwidth that corresponds to the second visible color wavelength, so that the contrast between the first visible color wavelength and a second visible color wavelength is enhanced. For example, if the first visible color wavelength is red and the second visible wavelength color is green, passing through the holographic element could cause the green to appear significantly dimmer, thus enhancing a viewers ability to distinguish between green and red.

The first visible color wavelength can be in the red, orange, yellow, green, or blue region of visible wavelength light. In some embodiments, the first visible color wavelength comprises a wavelength that is in the green bandwidth. In some embodiments, the first visible color wavelength is in the range of about 450 nm to about 600 nm, about 500 nm to about 580 nm, or about 520 nm to about 550 nm. In some embodiments, the first visible color wavelength comprises a wavelength that is in the red bandwidth. In some embodiments, the first visible color wavelength is in the range of about 530 nm to about 800 nm, about 560 to about 720 nm, about 580 to about 710 nm, about 600 to about 700 nm, about 530 to about 720 nm, about 540 to about 710 nm, or about 550 to about 700 nm.

In some embodiments, the holographic element may provide an enhanced ability to distinguish between a first visible color wavelength and a second visible color wavelength.

The second visible color wavelength can be in the red, yellow, orange, green, or blue region of visible wavelength light. In some embodiments, the second visible color wavelength is less than the first visible color wavelength, which means that the second visible color wavelength is shorter, or more blue-shifted, than the first visible color wavelength. In some embodiments, the second visible color wavelength comprises a wavelength that is in the green, orange, or yellow bandwidth. For example, in individuals suffering from a red-green color deficiency, it would be beneficial to distinguish green wavelength light from red wavelength light by decreasing the perception of green to orange wavelength light. In some embodiments, the second visible color wavelength comprises a wavelength that is in the green bandwidth. In some embodiments, the second visible color wavelength is in the range of about 450 nm to about 540 nm, about 550 nm, about 560 nm, or about 600 nm; about 500 nm to about 540 nm, about 550 nm, about 560 nm, or about 580 nm; or about 520 nm to about 550 nm.

In some embodiments, the first visible color wavelength is less than the second visible color wavelength, which means that the first visible color wavelength is shorter, or more blue-shifted, than the second visible color wavelength. In some embodiments, the second visible color wavelength comprises a wavelength that is in the red bandwidth. For example, in individuals suffering from a red-green color deficiency, it would be beneficial to distinguish green wavelength light from red wavelength light by decreasing the perception of red wavelength light. In some embodiments, the second visible color wavelength is in the range of about 530 nm to about 800 nm, about 560 to about 720 nm, about 580 to about 710 nm, about 600 to about 700 nm, about 530 to about 720 nm, about 540 to about 710 nm, or about 550 to about 700 nm.

In some embodiments, an ophthalmic device for interposition within the user's line of sight is provided, the device comprising a substantially transparent substrate; and a holographic element, wherein the holographic element is in optical communication with the substrate and disposed within the line of sight. In some embodiments, the holographic element comprising an interference pattern is designed to diffract a selected portion of the visible spectrum of the incident light, such as the second visible color wavelength or the darkened wavelength range, out of the line of sight. In some embodiments, the holographic element comprising an interference pattern is designed to diffract a selected portion of the visible spectrum of the incident light, such as the second visible color wavelength or the darkened wavelength range, at an angle less than that of the critical angle, wherein the diffracted light is trapped by total internal reflection (TIR) within a substantially transparent substrate. In some embodiments, the interference pattern can comprise a plurality of varied refractive index materials. In some embodiments, the interference pattern comprises a plurality of ridges disposed in the surface of the holographic element. In some embodiments, the holographic element can be a hologram. In some embodiments, the hologram is formed by a laser. In some embodiments, the laser may have a wavelength in the UV, visible, or IR portion of the spectrum. In some embodiments, at least 40% of the undesired incident light spectrum is removed upon passing through the holographic element. In some embodiments, at least 10% of the desired incident light spectrum passes through the holographic element. In some embodiments, the desired removed wavelength is between about 450 nm to about 600 nm.

A device for improving a person's ability to distinguish colors can further comprise a positioning component. A positioning component is coupled to the holographic element so that it can position the holographic element with respect to an active position with respect to an eye of a person. For example, a positioning component may be a frame for eyewear, such as a pair of glasses, that holds a holographic element, such as a lens, in place so that the wearer's eye can view objects, or images, in the line of sight through the holographic element. Similarly, a positioning component may be a frame for a window, such as a window of a vehicle or a building, and the holographic element may be a window. A positioning component may also be a component of a device containing a display or a screen. For example, a positioning component may be an adhesive layer that adheres a holographic element to a screen or display. Or a positioning component may be a frame or fixture that holds the holographic element between the images of a screen or display and the viewer. A positioning component may also be a shape, such as a curvature of a contact lens that acts as holographic element. For a holographic element that is an intraocular lens, the positioning component may be the haptic.

In some embodiments, the holographic element comprises a photosensitive film. In some embodiments, the film can be a dichromated gelatin, a chemical-modified dichromated gelatin, a photopolymer, a nanoparticle-doped photopolymer, a silver halide film, etc. In some embodiments, the holographic element can be disposed within the substantially transparent substrate. In some embodiments, the holographic element can be disposed on top of the substantially transparent substrate. In some embodiments, the holographic element can be disposed in between two or more substantially transparent substrates. In some embodiments, the holographic element is configured so that the device modifies a color of an object or image viewed through the ophthalmic device by a user, for example by reducing the brightness, to thereby allow the user to better distinguish colors.

In some embodiments, a method for making an ophthalmic or optical device is described comprising selecting a darkened spectral range, or a spectral range of reduced visual transmission, for the ophthalmic or optical device; and creating a holographic interference pattern within the ophthalmic or optical device. In some embodiments, creating a holographic interference pattern within the ophthalmic or optical device comprises impinging holographic media with an object beam. In some embodiments, the holographic media can be photosensitive media film. In some embodiments, the method can further comprise developing the impinged photosensitive media film. In some embodiments, the method can further comprise laminating the impinged photosensitive media to a substantially transparent substrate. In some embodiments, the ophthalmic or optical device can comprise a substantially transparent matrix lens material, and wherein the holographic interference pattern is formed within the matrix material.

In some embodiments, the interference pattern comprises a plurality of varied refractive index materials. The interference pattern can comprise plural sections of material, wherein the materials have different refractive indices. In some embodiments, the interference pattern can be plural sections of different materials, the different materials having different respective refractive indices. In some embodiments, the interference pattern can be plural sections of differing refractive indices configured to represent the desired refractive characteristics. In some embodiments, the interference pattern can comprise a plurality of ridges defined, formed in and/or disposed upon the surface of the holographic element.

In some embodiments, the holographic element can be configured so that the ophthalmic or optical device modifies a color of an object or image viewed through the ophthalmic or optical device by a user to thereby allow the user to better distinguish colors. In some embodiments, the holographic element can be configured so that ophthalmic or optical device modifies the refractive characteristics of the ophthalmic or optical device. In some embodiments, the differing refractive characteristics can be the diffraction or refraction of spectral elements of the incident light that are to be selectively removed from the transmitted light from the ophthalmic or optical device. In some embodiments, the holographic element comprises a hologram, wherein the hologram is made with a laser. In some embodiments, the holographic element comprises a hologram, wherein the hologram is made with a laser having substantially the same wavelength as the wavelength intended to have reduced transmission, when visible light passes therethrough. In some embodiments the reduced transmission can be due to total internal reflection. In some embodiments, the holographic element comprises a hologram, wherein the hologram is made with a laser having a substantially different wavelength as the wavelength intended to have reduced transmission, when visible light passes there through. Thus for example, in some embodiments, transmitted light from the ophthalmic or optical device can have less than about 60%, less than about 50%, less than about 40%, less than about 30%, less than about 25%, less than about 10%, less than about 5%, less than about 3%, and/or less than about 1% of the light in the wavelength range intended to be darkened or to have reduced transmission. In some embodiments, the darkened wavelength range, or the wavelength range intended to have reduced transmission, can be about 350 nm to about 900 nm; about 400 nm to about 800 nm; about 450 or 475 nm to about 500 or 600 nm; about 450 nm to about 540 nm, about 550 nm, about 560 nm, or about 600 nm; about 500 nm to about 540 nm, about 550 nm, about 560 nm, or about 580 nm; or about 520 nm to about 550 nm; and/or any range bounded by, or between, any of these values. In some embodiments, the darkened wavelength range may correspond to blue light. In some embodiments, the darkened wavelength range may correspond to green light. In some embodiments, the darkened wavelength range may correspond to red light.

In some embodiments, the period of recording the hologram can be determined:

$$\frac{2\Lambda \cdot \sin \cdot \theta_{rec}}{2} = \lambda_{rec} \qquad \text{Eq (1)}$$

where $\Lambda$ is the period of the hologram; $\theta_{rec}$ is the angle between the two recording waves in the medium and $\lambda_{rec}$ is the wavelength of the recording beam; and $$2\Lambda \cdot \sin \cdot \theta B = \lambda \qquad \text{Eq (2)}$$

where $\theta B$ is the Bragg angle and $\lambda$ is the wavelength of the illuminating light; and From the combination of Eqs. (1) and (2), we can obtain:

$$\theta_{rec} = 2 \arcsin \frac{\lambda_{rec}}{\lambda} \cdot \sin \theta B \qquad \text{Eq (3)}$$

Figure 5:
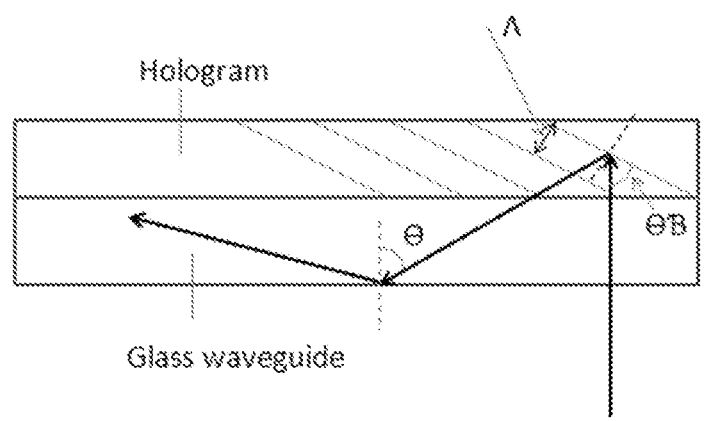
FIG. 5 shows a schematic of an embodiment of the designed Bragg angle.

In some embodiments, wherein the Bragg angle $\theta B$ is fixed, the angle between the two recording waves can be designed according to the wavelength of the illuminating light. As shown in FIG. 5, considering the total internal reflection of the glass substrate, the angle $\theta$ should satisfy the equation:

$$\theta \geq \theta c = \arcsin \frac{1}{n} \qquad \text{Eq (4)}$$

where $\theta c$ is angle of total internal reflection, n is the refractive index of the glass substrate In some embodiments, part of the spectrum passes through the holographic element without being darkened or reduced by diffraction. Thus for example, in some embodiments, transmitted light from the optical element can have more than about 5%, more than about 10%, more than about 20%, more than about 30%, more than about 40%, more than about 50%, more than about 60%, more than about 70%, and/or more than about 80% of the selected portion of the spectrum. In some embodiments, the selected included transmitted spectral light element is all light that is not specifically excluded. In some embodiments, the selected included transmitted spectral light element may be any light that is between about 350 to about 900 nm. In some embodiments, the selected included transmitted spectral light element can be the portion of the visible spectrum that is less than about 450, about 475 nm, or about 500 nm, and above about 530 nm, about 550 nm, about 560 nm, or about 500 nm. Thus, for example, the light that is transmitted could be all visible light that is shorter than green light, or is longer than yellow or orange light, or everything except part of the green to orange range of the visible spectrum. In some embodiments, the selected included transmitted spectral light element may include blue light. In some embodiments, the selected included transmitted spectral light element may include green light. In some embodiments, the selected included transmitted spectral light element may include red light. In some embodiments, the selected included transmitted spectral light element may include blue and green light. In some embodiments, the selected included transmitted spectral light element may include blue and red light. In some embodiments, the selected included transmitted spectral light element may include green and red light.

In some embodiments, the holographic element can be tuned for selected spectral inclusion or exclusion by altering the shrinkage ratio of the holographic element. For example, a holographic element with larger positive shrinkage ratio will have a blue-shifted (lower wavelength number) peak wavelength. In some embodiments, the shrinkage ratio may be altered during processing (e.g, adjusting the length of time the photosensitive media is vacuum-dried). In some embodiments, the thickness of the element is between about 5 and about 15 microns. In some embodiments, the thickness of the element is between about 8 and about 10 microns.

In some embodiments, the holographic element can comprise a photosensitive film. In some embodiments, the film can be a dichromated gelatin, a chemical-modified dichromated gelatin, a photopolymer, a nanoparticle-doped photopolymer, a silver halide film, or any combination thereof.

In some embodiments, the holographic element, e.g., a photosensitive film, can be placed adjacent to, laminated with, disposed upon, and/or attached to a substantially transparent substrate. In some embodiments, the substantially transparent substrate can be a glass or a polymeric material.

In some embodiments, the holographic element can be disposed onto and/or formed within the substantially transparent substrate.

In some embodiments, a method for making an ophthalmic or optical device comprises selecting a spectral range of undesired visual transmission for the ophthalmic or optical device; and creating a holographic interference pattern within the ophthalmic or optical device. In some embodiments, the spectral range selected can be any of those previously described.

It may be desirable for an ophthalmic or optical device to be able to diffract more than one emissive bandwidth. For example, a patient may require the diffraction of two different bandwidths in order to enhance their ability to distinguish colors. In some embodiments, the ophthalmic or optical device may comprise multiple holographic elements. The holographic elements may be in the same layer or in separate layers.

It may be desirable for an ophthalmic or optical device to be able to diffract a wide emissive bandwidth. For example, a patient may require the diffraction of a bandwidth greater than about 20 nm wide, greater than about 30 nm wide, greater than about 50 nm wide, greater than about 80 nm wide, greater than about 100 nm wide, greater than about 150 nm wide, or greater than about 200 nm wide, in order to enhance their ability to distinguish colors. In some embodiments, the ophthalmic or optical device may comprise a single holographic element that is capable of diffracting the entire width of bandwidth that is required for the particular patient. In some embodiments, the ophthalmic or optical device may comprise multiple holographic elements in order to diffract the entire width of bandwidth that is required for the particular patient. In some embodiments, the multiple holographic elements may be in the same layer or in separate layers.

A holographic element may be in optical communication with a substantially transparent substrate, such as a lens, a window, or a transparent layer on a screen. Alternatively, a lens, a window, a transparent layer on a screen, or another functional transparent material, may include a holographic element as all or part of its structure, rather than being a separate feature.

A substrate may comprise a substantially transparent matrix material such as glass, thiourethane, polycarbonate (PC), allyl diglycol carbonate, polyacrylate, esters of a polyacrylic acid or a polyacrylic acid, 2-hydroxyethyl methacrylate, polyvinylpyrrolidinone, hexafluoroacetone-tetrafluoroethylene-ethylene (HFA/TFE/E terpolymers), polymethyl methacrylate (PMMA), polyvinyl butyral (PVB), ethylene vinyl acetate, ethylene tetrafluoroethylene, polyimide, polystyrene, polyurethane, organosiloxane, polyvinyl butyral-co-vinyl alcohol-co-vinyl acetate, poly(ethylene teraphthalate) (PET), cellulose triacetate (TAC), acrylonitrile, polybutadiene-modified polystyrene, vinyl resins, polyethylene, polyvinyl chloride, polyvinyl acetate, polyvinyl alcohol, polyvinyl butyral, cellulose derivatives, epoxies, and polyester resins.

In some embodiments, creating a holographic interference pattern within the ophthalmic or optical device comprises impinging holographic media with an object beam. This and other embodiments of creating an interference pattern are generally depicted in FIGS. 1, 2, 3, and 6.

Figure 2:
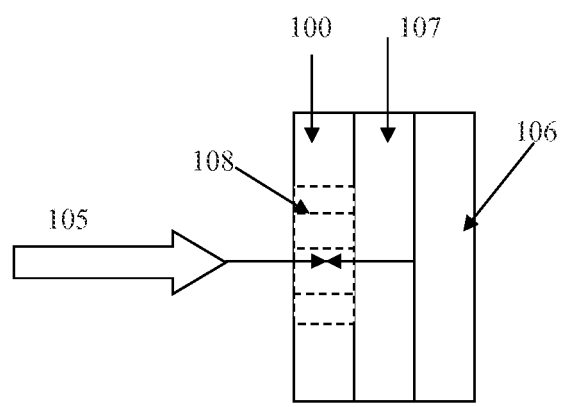
FIG. 2 is a schematic of an embodiment of recording a hologram onto a media.
Figure 3:
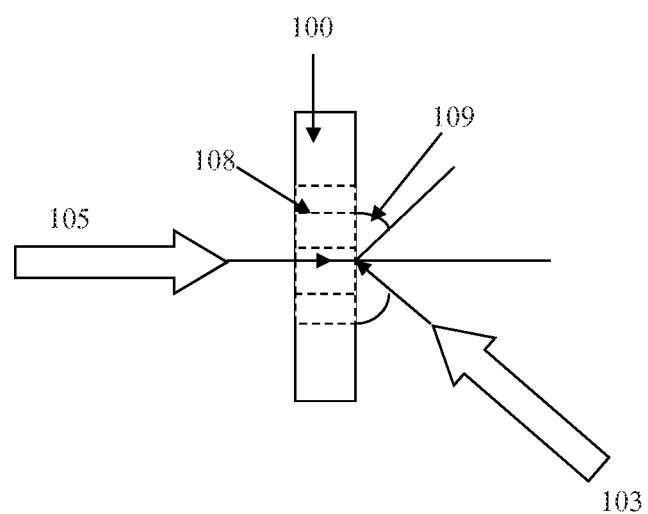
FIG. 3 is a schematic of an embodiment of recording a hologram onto a media.

FIGS. 1-3 are schematic depictions illustrating a holographic element recording device. The film with the holographic element is designed to reflect certain portions of visible light. Depending on how the holographic elements are recorded on to the photosensitive media, the film may be unidirectional or may perform the same from both sides. In some embodiments the film is unidirectional. In some embodiment, the film performs the same from both sides.

In FIG. 1, the photosensitive media 100 is positioned on a substrate 101, which is then placed with photosensitive media 100 in optical contact with a waveguide 102. The reference beam 103 passes through an input coupler prism 104 and is internally reflected within waveguide 102 until it reaches photosensitive media 100. Simultaneously, object beam 105 and reference beam 103 are impinged onto photosensitive media 100 at the same location to create a holographic element within the photosensitive media 100. In some embodiments, object beam 105 and reference beam 103 impinge on the same side of photosensitive media 100.

In FIG. 2, photosensitive media 100 is positioned on a mirror substrate 106, and an index matching liquid 107 is used to adhere photosensitive media 100 to mirror substrate 106. In FIG. 2, mirror substrate 106 causes object beam 105 to reflect back on itself to create interference pattern 108 in the photosensitive media 100.

In FIG. 3, object beam 105 intersects reference beam 103 which are applied on opposite sides of photosensitive media 100 to create interference pattern 108. Different angles 109 between object beam 105 and reference beam 103 can also be used in order to adjust the angle at which the holographic element diffracts the undesired light away from the film. In some embodiments, this angle can be adjusted so that the diffracted light is subject to total internal reflection.

Figure 6:
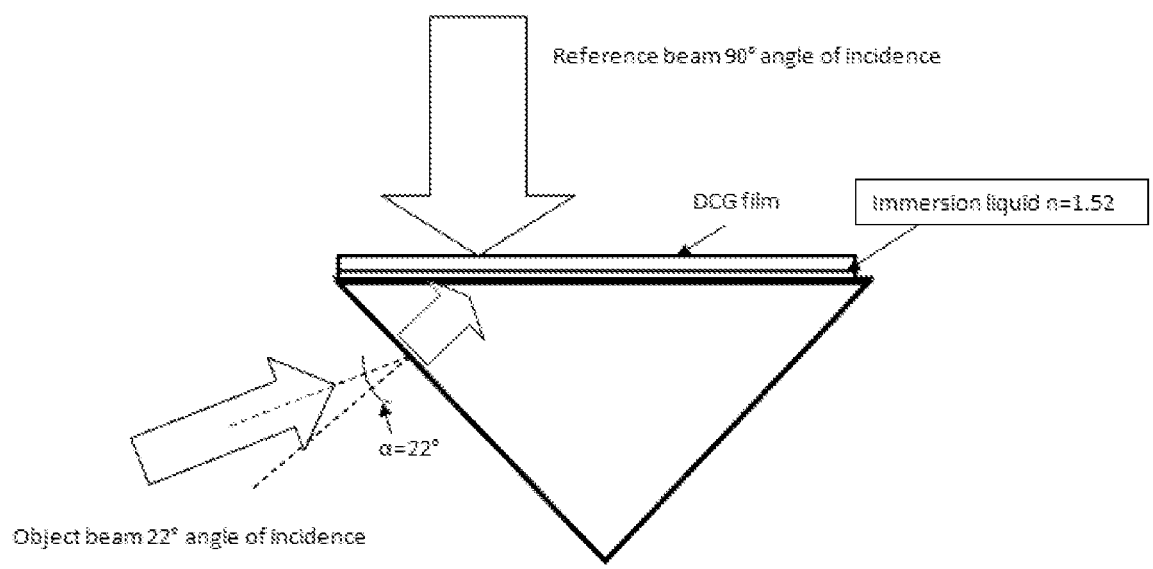
FIG. 6 shows a schematic of an embodiment of recording onto a media wherein the object and reference beams are on opposite sides of the media.

As depicted in FIG. 6, an interference pattern that will result in total internal reflection for a portion of the visible spectrum can be created by coupling the object beam to a prism.

In some embodiments of the method, the optical system for creating a holographic element comprises a laser source with a wavelength between about 400 nm and about 800 nm. In some embodiments of the method, the optical system for creating a holographic element comprises a laser source with a wavelength between about 440 nm and about 570 nm. In some embodiments the wavelength of the laser source is selected from about 457 nm, about 488 nm, about 514 nm, and about 532 nm. In some embodiments, the optical system comprises two or more laser sources that emit different color laser beams. In some embodiments, said two or more laser sources emit laser beams selected from the group consisting of red, green, and blue color laser beams.

In some embodiments, the holographic media is a photosensitive media film. In some embodiments, the method further comprises developing the impinged photosensitive media film.

The wavelength which is diffracted by the holographic element may be adjusted in several ways. In some embodiments, the peak diffraction wavelength of the holographic film may be determined by the laser source that is used to record the holographic element onto the photosensitive media. In some embodiments, the method of developing the photosensitive media may also be used to adjust the peak diffraction wavelength of the film. For example, the length of time the film is dried, and/or the temperature at which the film is dried, may alter the peak diffraction wavelength of the film. In some embodiments, the film may be dried for between about 1 min to about 100 hrs. In some embodiments, the film may be dried for between about 3 min to about 20 hrs. In some embodiments, the film may be dried at a temperature of about 25° C. to about 150° C. In some embodiments, the film may be dried at a temperature of about 50° C. to about 100° C.

In some embodiments, the impinged photosensitive film is developed by placing the photosensitive film in Kodak Fixer solution for about 1 min and then rinsed about for about 3 min through a running deionized (DI) water bath.

In some embodiments, the method can further comprise laminating the impinged photosensitive media to a substantially transparent substrate. In some embodiments, the ophthalmic or optical device comprises a substantially transparent matrix material, which can be any material useful in making a film or lens. A "substantially transparent" material includes any material through which an image can be recognized, and the ability to discern between colors in the image can be enhanced. Some degree of shading may be present as long as the ability to discern between colors can be enhanced. In an embodiment, the ophthalmic or optical device has a transparency that is at least about 70%, about 80%, or about 90%.

The substantially transparent matrix material can comprise a composition that includes glass or various types of polymers in various combinations. It may be desirable for the material to be non-harmful and robust. In an embodiment, the substantially transparent matrix material comprises a material, including, but not limited to, glass; a thiourethane; a polycarbonate (PC); allyl diglycol carbonate (such as CR-39); a polyacrylate such as a polyacrylic acid (including methacrylic acid), esters of a polyacrylic acid or a polyacrylic acid such as methyl, ethyl, propyl, isopropyl, n-butyl, sec-butyl, isobutyl, t-butyl, pentyl isomers, hexyl isomers, cyclobutyl, cyclopentyl, or cyclohexyl esters, etc., 2-hydroxyethylmethacrylate, and polyacrylate hydrogels; polyvinylpyrrolidinone; one or more terpolymers of hexafluoroacetone-tetrafluoroethylene-ethylene (HFA/TFE/E terpolymers), polymethyl methacrylate (PMMA), a polyvinyl butyral (PVB), ethylene vinyl acetate, ethylene tetrafluoroethylene, a polyimide, a polystyrene, a polyurethane, organosiloxane, a poly(vinyl butyral-co-vinyl alcohol-co-vinyl acetate, and combinations thereof.

Some ophthalmic or optical devices may comprise a substantially transparent component that is laminated, or attached, to the holographic element. The substrate layer may be coated with a layer comprising a substantially transparent layer and a holographic element disposed in the transparent layer. A substrate layer may comprise any suitable polymeric material such as, but not limited to, PET, TAC, a thiourethane; a PC; allyl diglycol carbonate (such as CR-39); a polyacrylate, such as polyacrylic acid, polyalkacrylic acid (including methacrylic acid), esters of a polyacrylic acid or a polyacrylic acid such as methyl, ethyl, propyl, isopropyl, n-butyl, sec-butyl, isobutyl, t-butyl, pentyl isomers, hexyl isomers, cyclobutyl, cyclopentyl, or cyclohexyl esters, etc., 2-hydroxyethylmethacrylate, and including polyacrylate hydrogels; polyvinylpyrrolidinone; one or more terpolymers of hexafluoroacetone-tetrafluoroethylene-ethylene (HFA/TFE/E terpolymers), PMMA, a PVB, ethylene vinyl acetate, ethylene tetrafluoroethylene, a polyimide, a polystyrene, a polyurethane, organosiloxane, a poly(vinyl butyral-co-vinyl alcohol-co-vinyl acetate, and combinations thereof.

For devices in the form of eyewear such as glasses or sunglasses, a lens or optical element may be composed of any optically suitable plastic, or they may be composed primarily of glass, or other vitreous material. Included among the suitable optical plastics are thermoplastic synthetic resins, including poly(diethylene glycol bis(allyl carbonate)); polyurethane comprising a diethylene glycol polyol; thiourethane resins from isocyanate and polythiol; acrylates such as polymers of $C_{1-6}$ alkyl esters of methacrylic acid (including methyl methacrylate, ethyl methacrylate, propyl methacrylate, butyl methacrylate, etc.), $C_{1-6}$ alkyl esters of acrylic acid (including methyl acrylate, ethyl acrylate, propyl acrylate, butyl acrylate, etc.), and related acrylic resins; polystyrenes, including polystyrene homopolymers, as well as copolymers of styrene and acrylonitrite, polybutadiene-modified polystyrene, etc.; polycarbonates; vinyl resins such as polyethylene, polyvinyl chloride, polyvinyl acetate, polyvinyl alcohol, polyvinyl butyral, etc.; ionomers and monochlorotrifluoroethylene resins; cellulose derivatives, including cellulose acetate, cellulose nitrate, ethyl cellulose, cellulose acetate butyrate, etc; epoxies; polyester resins; and combinations thereof.

In some embodiments, the method can comprise a substantially transparent matrix lens material, and wherein the holographic interference pattern is formed within the matrix material.

In some embodiments of the method, additional materials may be used, such as glass plates or polymer layers. The materials may be used to protect the holographic element. In some embodiments, glass plates selected from low iron glass, borosilicate glass, or soda-lime glass, may be used in the ophthalmic or optical device. In some embodiments, the composition of the glass plate or polymer layers may also further comprise a strong UV absorber to block harmful high energy radiation. In some embodiments, the composition of the glass plate or polymer layers may also further comprise an anti-glaring or anti-reflection material. In some embodiments, the composition of the glass plate or polymer layers may also further comprise a photochromic material or an electrochromic material. In some embodiments, the composition of the glass plate or polymer layers may also further comprise a polarized coating or material. In some embodiments, the composition of the glass plate or polymer layers may also further comprise a scratch resistant coating or material. In some embodiments, the composition of the glass plate or polymer layers may also further comprise an anti-fog coating or material.

In some embodiments, additional materials or layers may be used such as edge sealing tape, frame materials, polymer materials, or adhesive layers to adhere additional layers to the device. In some embodiments, the device further comprises an additional polymer layer containing a UV absorber. In some embodiments, the substantially transparent substrate of the ophthalmic or optical device further comprises a UV absorber.

In some embodiments of the device, the ophthalmic or optical device further comprises a UV stabilizer, antioxidant, absorber, which may act to block high energy irradiation. In some embodiments of the device, the ophthalmic or optical device further comprises an anti-glaring or anti-reflection coating or material. In some embodiments of the device, the ophthalmic or optical device further comprises a photochromic material or a photochromic coating, which may act to darken the device when exposed to intense sunlight (i.e., the glasses may be clear indoors and then the photochromic material tints the glasses when outdoors and exposed to intense sunlight so that the glasses become sunglasses). In some embodiments of the device, the ophthalmic or optical device further comprises an electrochromic material. In some embodiments of the device, the ophthalmic or optical device further comprises a polarized material or coating. In some embodiments of the device, the ophthalmic or optical device further comprises a scratch resistant coating or material. In some embodiments of the device, the ophthalmic or optical device further comprises an anti-fog coating or material.

In some embodiments of the device, the ophthalmic or optical device further comprises an anti-glaring or anti-reflection material or coating. An antireflective or anti-reflection (AR) coating is a type of optical coating applied to the surface of lenses and other optical devices to reduce reflection. In some embodiments, an anti-reflective coating (also called anti-glare coating) is a microscopically thin multilayer coating that eliminates reflections from the front and back surface of eyeglass lenses. Many coatings consist of transparent thin film structures with alternating layers of contrasting refractive index. Layer thicknesses are chosen to produce destructive interference in the beams reflected from the interfaces, and constructive interference in the corresponding transmitted beams. This makes the structure's performance change with wavelength and incident angle, so that color effects often appear at oblique angles. A wavelength range must be specified when designing or ordering such coatings, but good performance can often be achieved for a relatively wide range of frequencies; usually a choice of IR, visible, or UV is offered.

Photochromic coatings darken on exposure to specific types of light, most commonly UV radiation. Once the light source is removed (for example by walking indoors), the lenses will gradually return to their clear state. Photochromic lenses may be made of glass, polycarbonate, or another plastic. In some embodiments, photochromatic or glass lenses contain molecules of silver chloride, or another silver halide, embedded within them. These molecules are transparent to visible light in the absence of UV rays, which is normal for artificial lighting. When exposed to UV rays, as in direct sunlight, the molecules undergo a chemical process that causes them to change shape and absorb portions of the visible light, causing the lenses to darken. This process is reversible; once the lens is removed from strong sources of UV rays, the silver compounds return to a state which allows all light through. In some embodiments of the device, the ophthalmic or optical device further comprises a photochromic material, which may act to darken the device when exposed to intense sunlight (i.e., the glasses may be clear indoors and then the photochromic material tints the glasses when outdoors and exposed to intense sunlight so that the glasses become sunglasses). In some embodiments, plastic photochromic lenses rely on organic photochromic molecules (e.g., oxazines and naphthopyrans) to achieve the reversible darkening effect.

In some embodiments of the device, the ophthalmic or optical device further comprises an electrochromic material. Electrochromic devices change light transmission properties in response to voltage and thus allow control over the amount of light and heat passing through. In electrochromic windows, the electrochromic material changes its opacity; it changes between a colored, translucent state (usually blue) and a transparent state. In some embodiments of the device, the ophthalmic or optical device further comprises an electrochromic material which may be used to block a certain portion of the light when desired (e.g., a button on the device can be pushed to tint the glasses when outside).

EXAMPLES

Example 1—HOE 1

A glass substrate was cut to about 7 inch×7 inch square. The cut glass sheet was cleaned with soap (washing detergent) and water, and then dried by nitrogen gas at room temperature.

Prepare Dichromate Gelatin (DCG) Solution

In a light controlled (safe red light lamp) environment, 160 ml deionized (DI) water was added to 24 g of 300 bloom gelatin (Great Lakes Gelatin, Greyslake, IL) and soaked for about 1 hour. The mixture was then stirred at about 50° C. until the gelatin was completely melted/dissolved (e.g., about 30 min). Eight grams of ammonium dichromate $((NH_4)_2CrO_4)$ was dissolved in about 40 ml DI water. This $(NH_4)_2CrO_4$ solution was added slowly to the gelatin solution and mixed for about 30 min at room temperature. The $(NH_4)_2CrO_4$/gelatin mixture was filtered through a commercially available coffee filter paper. The filtered solution was kept in 50° C. water bath to prevent solidification.

Glass Substrate Coating

In a light controlled (safe red light lamp) environment, the cleaned and dried glass substrate sample was blown with $N_2$ gas (room temperature for about 30 sec) and heated to about 60° C. The heated plate was spin coated with about 6 tablespoons filtered DCG solution at about 85 rpm for about 5 min. The coated glass substrate was then dried at about 50% humidity and about 20° C. for about 20 hr. The thickness of the film was about 8 to 10 microns.

Recording of Hologram

The DCG coated glass substrate was then cut into multiple 2 inch×2 inch pieces. An index matching liquid was applied between a mirror and the glass substrate and then the DCG film was attached face up to the flat mirror. The DCG film was then exposed to an expanded and collimated (about 3 inch diameter) coherent 2 W 532 nm laser beam (Coherent Verdi 2 W) for about 25 sec. A hologram was formed by recording interferometric pattern on the DCG film based on the interference between the incident (object) laser beam and the reflected (reference) laser beam from the mirror.

Development of Hologram

After recording, the DCG film-coated glass was detached from the mirror and was developed in Kodak Fixer solution for about 1 min and then rinsed about 3 min through a running DI water bath.

The substrate was then, sequentially rinsed in isopropyl alcohol (IPA)/water solutions (25/75, 50/50, 75/25, 90/10, and 100/0) for about 30 sec each. The film was then dried in an 80° C. chamber with a $N_2$ gas flow of about 30 CFM for about 10 min. The dried film was then scratched (removed) about 2 mm about the entire perimeter of the film. A second 2 inch×2 inch glass substrate, prepared as described earlier, was heated at about 85° C. for about 10 min. About 0.2 ml of UV curable epoxy (NOA86H, Norland Products, Inc.) was placed on the surface of the second prepared glass substrate. The dried film was then deposited between the first and second glass substrates at room temperature with (until excess UV epoxy and air bubbles squeeze out any pressure/No heat) pressure and laminated. The laminated sample was then cured with about 10 mW/cm² UV light (about 360 nm) (LOCKTITE, Dusseldorf Germany) for about 2 min.

The total transmittance of the obtained holographic element was measured by Shimadzu UV3300 (Shimadzu, Japan). First, continuous spectrum light was irradiated from a halogen lamp source at 150 W (MC2563, Otsuka Electronics, Inc., Japan) with no sample in the sample holder to obtain air reference transmission data. Next the holographic element sample (Example 1—HOE 1) was placed in the sample holder and irradiated with the same halogen lamp source. The transmitted spectrum was acquired for each sample by the multi channel photo detector.

Figure 4:
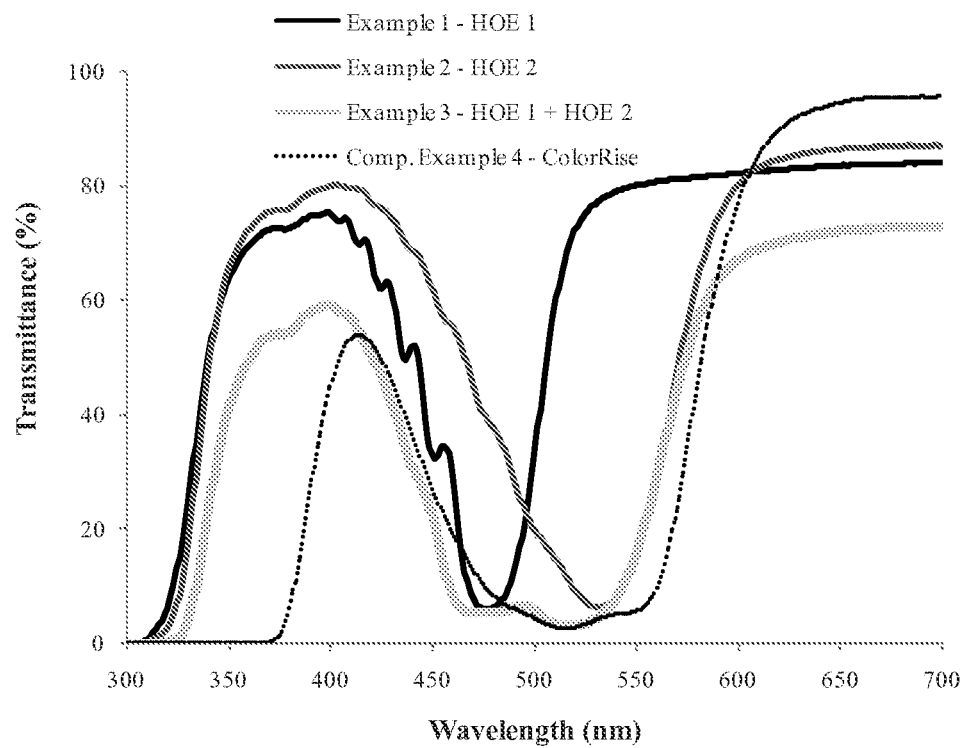
FIG. 4 shows the light transmittance spectra for embodiments of an device described herein.

In addition, the transmittance spectrum was used to determine the hologram diffraction peak. The results are shown in FIG. 4. The lowest transmittance wavelength was about 535 nm which is the peak diffraction wavelength of the holographic element.

Example 2—HOE 2

A second holographic element sample was prepared in a manner similar to that described above, except that the recorded and developed holographic element film was vacuum dried for prolonged time of about 2 hr at 80° C. to control the shrinkage of the holographic element film, resulting in a holographic element film centering wavelength of about 480 nm. FIG. 4 shows the measured transmittance spectrum for the Example 2 film.

Example 3—HOE 1 and HOE 2

A 2 inch×2 inch glass substrate of 535 nm centering wavelength and a 2 inch×2 inch glass substrate of 480 nm centering wavelength, prepared as described above, were heated at about 85° C. for about 10 min. About 0.2 ml of UV curable epoxy (NOA86H, Norland Products, Inc.) was placed on the surface of the second prepared glass substrate (480 nm wavelength substrate). The two glass substrates were then deposited on one another (room temperature, and hand pressure) and laminated. FIG. 4 shows the measured transmittance spectrum for the Example 3 film.

Comparative Example 4—Color Rise

Commercially available Kuro ColorRise glasses (KuroVision, Kyoto, Japan) were used as a Comparative Example 4 device. Kuro ColorRise glasses are intended to aid persons with congenital red-green color vision deficiency to distinguish between colors that are difficult to distinguish in some situations. The Kuro ColorRise glasses are red tinted. FIG. 4 shows the measured transmittance spectrum for the Comparative Example 4 film.

As shown in FIG. 4, the films with the holographic elements were able to diffract certain portions of the visible light spectrum similar to the commercially available films. The commercially available film appears red tinted in contrast to the films of Examples 1-3 which are all substantially transparent and not tinted. Because the commercially available lenses are tinted, the purpose of the lenses is apparent to all outside observers, which is cosmetically unacceptable for some patients. Advantageously the holographic element films appear much clearer to outside observers.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing some embodiments (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate some embodiments and does not pose a limitation on the scope of any claim. No language in the specification should be construed as indicating any non-claimed element essential to the practice of some embodiments.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience. When any such inclusion or deletion occurs, the specification is deemed to contain the group as modified thus fulfilling the written description of all Markush groups used in the appended claims.

Certain embodiments are described herein, including the best mode known to the inventors for carrying out some embodiments. Of course, variations on these described embodiments will become apparent to those of ordinary skill in the art upon reading the foregoing description. The inventor expects skilled artisans to employ such variations as appropriate, and the inventors intend for the embodiments disclosed hereinto be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A device for improving a person's ability to distinguish colors comprising:
    two flat holographic elements, wherein at least one of the holographic elements comprises an interference pattern comprising a plurality of ridges disposed in the surface of the holographic element;
    a positioning component, coupled to and separating the holographic elements, and configured to position at least one of the holographic elements to an active position with respect to an eye of a person;
    wherein an image, having light of a first visible color wavelength and light of a second visible color wavelength, and passing through at least one of the holographic elements is viewable by the eye when at least one of the holographic elements is in the active position;
    wherein at least one of the holographic elements diffracts light of the second visible color wavelength thereby reducing the relative brightness of light of the second visible color wavelength; and
    wherein the difference in relative brightness between the first visible color wavelength and the second visible color wavelength enhances the ability to distinguish colors in the image.

2. The device of claim 1, further comprising a substantially transparent substrate in optical communication with at least one of the holographic elements.

3. The device of claim 1, wherein at least one of the holographic elements comprises a hologram, wherein the hologram is prepared using a laser.

4. The device of claim 1, wherein the second visible color wavelength is within a darkened wavelength range, wherein at least about 40% of the light of the image that is in the darkened wavelength range is removed upon passing through at least one of the holographic elements.

5. The device of claim 4, wherein the darkened wavelength range is from about 450 nm to about 600 nm.

6. The device of claim 5, wherein the darkened wavelength range is from about 450 nm to about 540 nm.

7. The device of claim 1, wherein at least 10% of the visible light of the image that is not in the darkened wavelength range is not removed upon passing through at least one of the holographic elements.

8. The device of claim 1, wherein at least one of the holographic elements comprises a photosensitive film.

9. The device of claim 8, wherein the film comprises a material selected from dichromated gelatin, chemical modified dichromated gelatin, photopolymers, nanoparticle doped photopolymers, or silver halide films.

10. The device of claim 2, wherein at least one of the holographic elements is disposed on the substantially transparent substrate.

11. The device of claim 2, wherein the substantially transparent substrate comprises glass, thiourethane, polycarbonate (PC), allyl diglycol carbonate, polyacrylate, esters of a polyacrylic acid or a polyacrylic acid, 2-hydroxyethylmethacrylate, polyvinylpyrrolidinone, hexafluoroacetone-tetrafluoroethylene-ethylene (HFA/TFE/E terpolymers), polymethyl methacrylate (PMMA), polyvinyl butyral (PVB), ethylene vinyl acetate, ethylene tetrafluoroethylene, polyimide, polystyrene, polyurethane, organosiloxane, polyvinyl butyral-co-vinyl alcohol-co-vinyl acetate, poly(ethylene teraphthalate) (PET), cellulose triacetate TAC, acrylonitrite, polybutadiene-modified polystyrene, vinyl resins, polyethylene, polyvinyl chloride, polyvinyl acetate, polyvinyl alcohol, polyvinyl butyral, cellulose derivatives, epoxies, or polyester resins.

12. The device of claim 1, further comprising a polymer layer, a glass layer, a UV absorber material or layer, an anti-glaring coating, an anti-reflection coating or material, a photochromic material or a photochromic coating, an electrochromic coating or material, a polarized material or coating, a scratch resistant coating or material, an anti-fog coating or material, or a combination thereof.

13. A method of improving color discernment comprising positioning or fitting a device of claim 1 so that at least one of the holographic elements is in the active position with respect to the eye of the person.

* * * * *